United States Patent Office 3,408,855
Patented Nov. 5, 1968

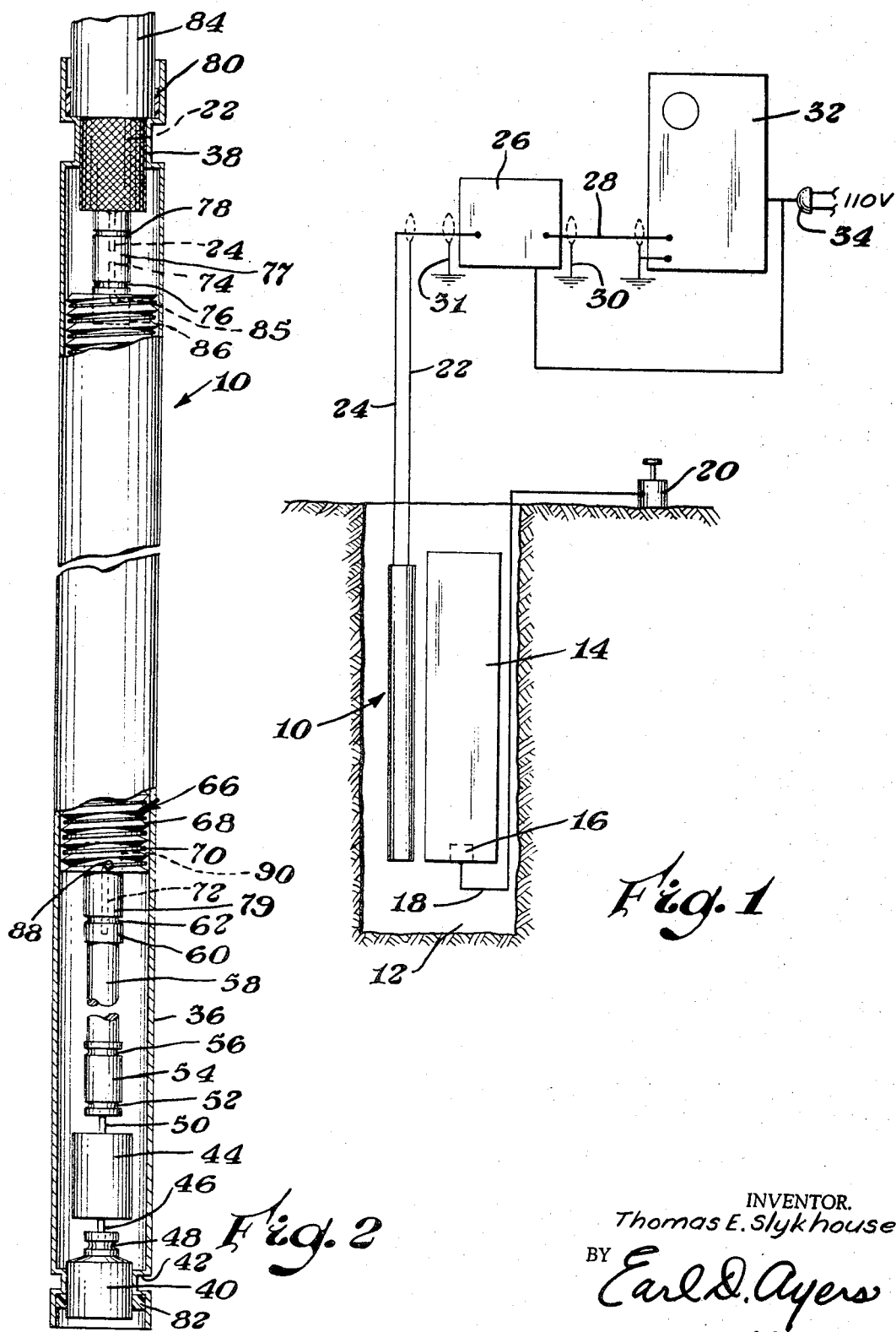

3,408,855
APPARATUS FOR DETERMINING DETONATION VELOCITY OF EXPLOSIVES
Thomas E. Slykhouse, Midland, Mich., assignor to The Dow Chemical Company, Midland, Mich., a corporation of Delaware
Filed Nov. 3, 1965, Ser. No. 506,154
5 Claims. (Cl. 73—35)

This invention relates to probes for use in measuring detonation velocities of explosives, and particularly to detonation gauges utilizing electrical resistance elements in their operation.

The problem of how to conveniently measure the detonation velocity of explosive material has been solved in various ways including the use of resistance probes. However, even when resistance type detonation gauges were used, problems still exist in how to obtain a resistance element where the resistance initially is and remains uniform along its length as the device is used and in how to provide a resistance type detonation guage which is free of spurious electrical effects in the detonating explosive.

Other needs are for a detonation gauge which is rugged, reliable, simple to construct, and sealed against fluids encountered where explosives are used.

Accordingly, a principal object of this invention is to provide an improved detonation velocity gauge.

Another object of this invention is to provide an improved, reliable and simple to construct detonation velocity gauge.

A further object of this invention is to provide an improved electrical resistance type detonation velocity gauge which is shielded from external electrical fields during its operation.

An additional object of this invention is to provide an improved, simple to construct, shielded resistance type detonation velocity gauge.

In accordance with this invention there is provided a resistance type detonation velocity gauge comprising, sealed within a thin walled metal sleeve which is adapted to progressively collapse as an adjacent explosive charge is detonated, a resistance element coupled at one end to said sleeve and at its other end to a metal rod, the metal rod being coupled at its other end to one end of a wire resistance element which is wound on a threaded electrically insulating rod. The other end of the wire resistance element is coupled through the end of said sleeve to an electrical lead. Another electrical lead is coupled to the metal sleeve.

When the detonation gauge is placed beside an explosive to be detonated with the end of the gauge which is remote from the wires coupled to the gauge being at or near the point of detonation, the sleeve collapses progressively as the detonation proceeds, giving a changing resistance along the gauge as the sleeve collapses along the wire wound resistance element.

The invention, as well as additional objects and advantages thereof, will best be understood when the following detailed description is read in connection with the accompanying drawing, in which:

FIG. 1 is a diagrammatical view of detonation velocity determining apparatus in accordance with this invention shown adjacent to an explosive charge whose detonation velocity is to be measured, and FIG. 2 is a side elevational view, partly in section, of a detonation gauge in accordance with this invention.

Referring to the drawing, and particularly to FIG. 1, there is shown a detonation velocity measuring gauge, indicated generally by the numeral 10, disposed in a shot hole 12, besides an elongated block of explosive material 14. As illustrated, the gauge 10 has its end which is remote from its electrical leads 22, 24 disposed at or near the end of the lower end of the explosive block 14 which contains an electrically actuated detonator 16. The detonator 18 is coupled to a magnetic type firing device 20 by means of electrical cable 18.

The leads 22, 24, commonly the shield and inner conductor, respectively, of a coaxial cable 84 (see FIG. 2), are coupled across the output leads of a substantially constant current power supply 26. The output leads of the power supply 26 also coupled through a cable lead 28 and ground 30 to the input of an oscilloscope 32, as is well known in the art. The oscilloscope 32 and power supply 26 are energized from a suitable electrical source (not shown) through the cable connector 34.

Referring now to FIG. 2, the detonation velocity determining gauge 10 comprises an outer metal sleeve 36 which has a crimp 38' at its upper end to couple it electrically and mechanically to the outer metal shield 22 of the cable 84.

The lower end of the sleeve 36 is closed at a crimp 42 against a crimping element 40. A sealant 80, 82, is used to form a liquid tight end seal at the upper and lower end respectively, of the sleeve 36.

The inner conductor 24 of cable 84 is coupled by means of crimp 78 to a coupling element 77. The coupling element 77 is then coupled mechanically to the upper end of an electrically insulating rod 66 having threads 68 along its outer surface from end to end. A wire wound resistor 70 is disposed between the threads 68 and is of such diameter that the wire of the resistor lies below the outer part of the threads 68. The upper end 74 of the wire from the resistor 70 is fed through a small bore 85 and down the bore 86 of the rod 66 into which the coupling element 77 extends. The wire end 74 is positively connected to the coupling element 77 by means of the crimp 76.

The lower end of the rod 66 contains bores 88, 90 which correspond to the bores 85, 86 in the other end of the rod. A coupling element 79, similar to the metal coupling element 77, is inserted in the bore 90, along with the end 72 of the wire of the resistor wire 70. The wire end 72 is positively electrically coupled to the element 79 and to a brass rod 58 inserted in the end of the coupling element 79 by means of crimp 62, with the wire end 72 passing inwardly through the bore 88 and thence down the bore 90.

The other end of the metal rod 58 is inserted in the end of a hollow metal coupling element 54 and held in electrical contact therewith by the crimp 56.

A resistor 44 has one lead 50 coupled to the coupling element 54 by means of the crimp 52 and its other lead 46 coupled to the element 40 by means of the crimp 48.

Thus, a resistance circuit comprising the sleeve 36, resistor 44, rod 58, and wire wound resistance 70 are connected across the power supply 26 by means of the cable 84.

In operation, with the detonation gauge 10 disposed beside the explosive charge 14, and the external circuitry, or its equivalent, coupled to the gauge 10, the charger 14 is detonated by means of the detonator 16.

As the detonation proceeds along the length of the material 14, the thin metal tube or sleeve 36 of the gauge 10 collapses progressively along the gauge, shorting out first against the brass rod 58 and then against the turns of the wire resistance 70 which, as mentioned previously, are disposed just back of the outer edge of the threads 68 of the insulating rod 66 which fits closely but slidably within the sleeve.

Just before firing, the resistance of the detonation gauge is the sum of the resistance of the fixed resistor 44 and of the wire resistor 70. As the detonation proceeds, it initially causes the fixed resistor 44 to be shorted out as the sleeve 36 collapses against the brass rod 58. Then, as the collapsing of the sleeve 36 progresses because of the progressing detonation of the adjacent explosive material 14, the wire resistance is progressively shorted out.

The sudden shorting out of the resistor 44 provides a reference potential which is used to trigger an external circuit (not shown). The brass rod, usually about 4 inches in length, provides a steady or constant voltage signal for a short time after the system is triggered (detonation initiated). Then, as the progressive collapsing of the sleeve 36 proceeds along the resistance 70, the changing resistance of the resistance 70 results in a changing output signal which is displayed on the oscilloscope 32, as is well shown in the art.

The value of the resistor 44 may be any suitable value, but a 22 ohm resistor has usually been used when the resistance of the wire resistance element has been held at about 100 ohms.

The threaded rod 66 is commonly made of nylon, but other insulating materials may be used. Similarly, metals other than brass may be used to make the rod 58.

Obviously, too, conductive materials other than aluminum may be used in the sleeve 36.

The operation of the detonation velocity gauge 10 is generally that shown in Caldecourt et al. copending application Ser. No. 476,863, filed Aug. 3, 1965, for "Detonation Gauge Apparatus."

The detonation velocity measuring gauge in accordance with this invention provides shielding against spurious signals from external electric fields, is water proof, rugged, simple to make and use, is inexpensive, and is very reliable in operation.

What is claimed is:
1. A detonation velocity measuring gauge comprising:
 (A) A helical resistance element having spaced apart turns,
 (B) A low resistance rod-like element, the length of said rod-like element being a minor fraction of the length of said helical resistance element,
 (C) A fixed resistance element, said helical resistance element, said rod-like element, and said fixed resistance element being disposed in end to end relationship in that order and electrically connected in series,
 (D) A hollow, deformable, elongated electrically conductive sleeve, said sleeve having a length and diameter such that it fits closely over but spaced from said helical resistance element, said rod-like element and said resistance element, one end of said resistance element being electrically coupled to said sleeve, and means for electrically connecting said sleeve and one end of said helical resistance element to an external circuit.

2. A gauge in accordance with claim 1, wherein said helical resistance element is wound on a supporting electrically insulating form which has spacer means extending outwardly therefrom.

3. A gauge in accordance with claim 2, wherein said insulating form is a rod and said spacer means are helical threads on the outer surface of said rod.

4. A gauge in accordance with claim 1, wherein the ends of said sleeve extend beyond said helical resistance element, rod-liike element, and resistance element and are sealed.

5. A gauge in accordance with claim 1, wherein said means for electrically connecting said sleeve and one end of said helical resistance element to an external circuit comprises a coaxial cable having an outer metal shielding and central conductor, said cable extending into one end of said sleeve and having said shielding coupled to said sleeve and said central conductor coupled to said helical resistance element.

References Cited

UNITED STATES PATENTS 3,027,751   4/1962   Jones _____ 73—35

OTHER REFERENCES

German application No. 1,176,904, dated August 1964.

JAMES J. GILL, *Primary Examiner.*